June 6, 1944.  M. F. CROUET  2,350,729
COMPRESSED FOLIATED WOOD
Filed May 19, 1942
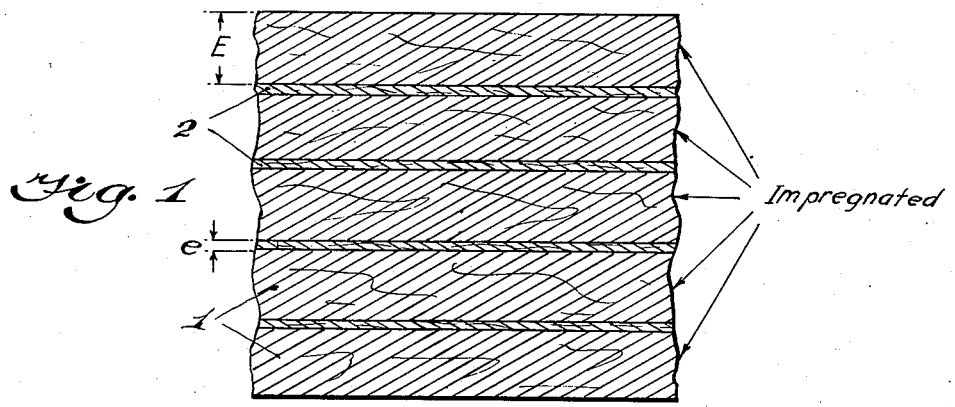
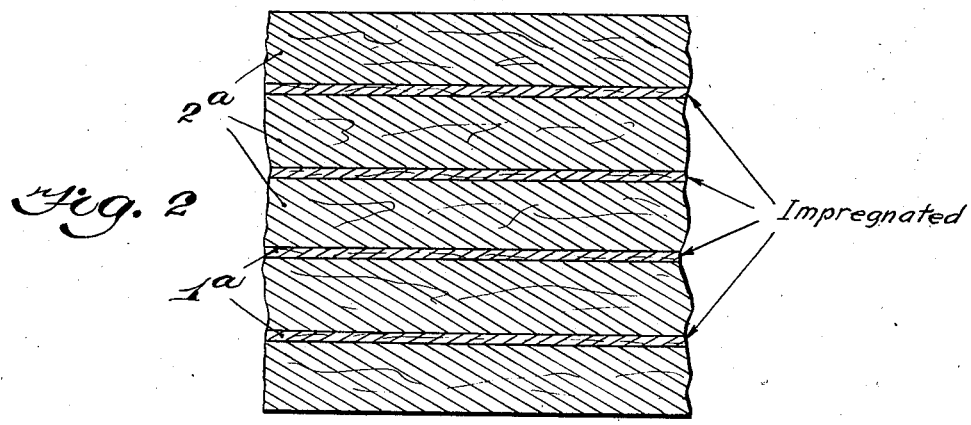
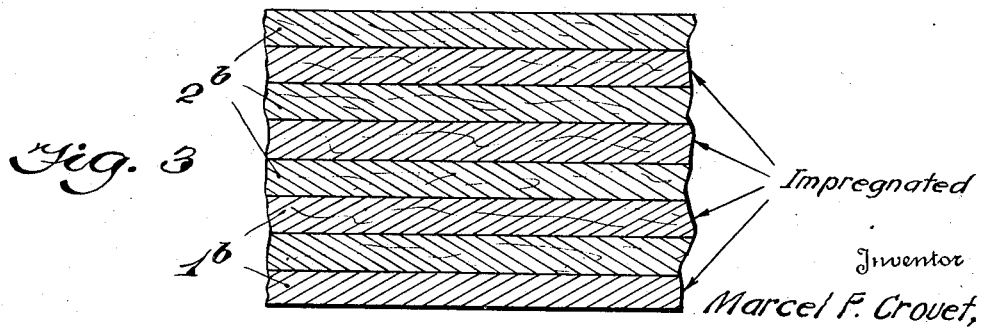
Inventor
Marcel F. Crouet, Patented June 6, 1944

2,350,729

UNITED STATES PATENT OFFICE 2,350,729

COMPRESSED FOLIATED WOOD

Marcel François Crouet, Beauchamp, France; vested in the Alien Property Custodian Application May 19, 1942, Serial No. 443,629
In France October 30, 1941

1 Claim. (Cl. 20—91)

This invention relates to compressed foliated wood, forming a laminated structure adapted for a variety of uses in which the physical resistance of the structure, viz. its ability to resist natural forces, such as temperature and moisture changes, and the mechanical resistance of the structure, viz. its ability to resist stresses, are highly important. The invention provides a structure in which the relative degrees of physical and mechanical resistances can be determined according to the use for which the structure is produced, by the relative thicknesses of the layers in two sets, respectively, forming the structure, the layers of one set being impregnated with a polymerisable resin and the layers of the other set being unimpregnated.

Compressed woods are already known which are formed of thin sheets arranged above another and more particularly the following ones:

1. A wood formed of thin sheets impregnated with polymerisable resin in vacuo and under pressure or by any other means, this wood being compressed to form blocks having a predetermined number of sheets.

This wood possesses very good properties of physical resistance owing to the large quantity of resin which it contains, but precisely because of this large quantity of resin its mechanical resistance is small.

2. A wood formed of non-impregnated sheets which are only coated with a polymerisable resin on each of their faces, this wood being compressed to form a block having a predetermined number of sheets. With this method of manufacture the coated faces are always in contact with another.

This wood possesses better mechanical resistance than the wood described under 1, owing to the small quantity of resin, but conversely the physical resistance is lower.

3. A compressed wood formed of thin sheets which have been preferably compressed and then coated with polymerisable resin on each of their faces and glued together to form blocks having a predetermined number of sheets. As regards the resistances which are obtained this wood is similar to that which has been described under 2.

Contrary to this the present invention relates to a compressed foliated wood characterized by thin sheets impregnated to the core with polymerisable resins and by thin sheets of natural wood which are neither impregnated nor coated, this foliated wood thus possessing mechanical and physical resistances which vary according to the relative thicknesses of the impregnated and of the natural sheets.

According to a form of embodiment each impregnated sheet is inserted between two sheets of natural wood, the said impregnated sheet acting as a gluing agent owing to the resin which it contains.

The sheets can be of variable thicknesses and of different species of wood.

The sheets can be arranged parallelly or perpendicularly or in a predetermined angle with one another according to the use for which the final product is intended.

The compression of the sheets forming the homogeneous blocks in order to obtain the said blocks is effected in a press with heating plates or moulds.

The pressure and the temperature which are used vary according to the kind of product to be obtained and to the synthetic resin which is used.

The thin veneering sheets which are used can be obtained by peeling, cutting or sawing.

Compressed foliated woods according to the invention are shown by way of example in the appended drawing in which Figures 1, 2 and 3 are three sectional views of three blocks of the said foliated woods.

Figure 1 shows a compressed foliated wood formed of impregnated sheets 1 of substantial thickness E and of natural sheets 2 of small thickness e. The sheets 1 are impregnated with synthetic resin.

This compressed foliated wood possesses a good physical resistance.

Figure 2 shows a block of thick natural sheets $2^a$ with very thin sheets $1^a$ impregnated with resin, this wood possesses good mechanical resistance.

It is desirable to use, for this composition, relatively incompressible woods such as acacia or hornbeam for the natural sheets and soft very compressible woods for the impregnated sheets.

Figure 3 shows a block formed of impregnated sheets $1^b$ and of natural sheets $2^b$ having the same thickness; this wood possesses nicely balanced physical and mechanical resistances.

I claim:

A compressed plywood structure comprising alternate impregnated and unimpregnated wood plies, the impregnated plies containing throughout their structure a polymerisable resin, and having a thickness several times greater than that of the unimpregnated plies, thereby increasing the physical resistance and decreasing the mechanical resistance of the structure.

MARCEL FRANÇOIS CROUET.